(12) United States Patent
Liu et al.

(10) Patent No.: US 11,731,367 B2
(45) Date of Patent: Aug. 22, 2023

(54) DRIVE SYSTEM FOR ADDITIVE MANUFACTURING

(71) Applicant: General Electric Company, Schenectady, NY (US)

(72) Inventors: Zhen Liu, Niskayuna, NY (US); Trent William Muhlenkamp, Cincinnati, OH (US); Christopher David Barnhill, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 17/355,461

(22) Filed: Jun. 23, 2021

(65) Prior Publication Data

US 2022/0410486 A1 Dec. 29, 2022

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/227* (2017.08); *B29C 64/245* (2017.08);
(Continued)

(58) Field of Classification Search
CPC ................ B29C 64/393; B29C 64/321; B29C 64/245; B29C 64/227; B29C 64/218; B33Y 10/00; B33Y 30/00; B33Y 50/02
(Continued)

(56) References Cited

U.S. PATENT DOCUMENTS

| 1,990,749 A | 2/1935 | Phillips et al. |
| 2,259,517 A | 10/1941 | Drenkard, Jr. |

(Continued)

FOREIGN PATENT DOCUMENTS

| CN | 101628477 A | 1/2010 |
| CN | 103210344 A | 7/2013 |

(Continued)

OTHER PUBLICATIONS

ADMATEC, Admaflex 300 DLP 3D Printer, Specifications, Features, Design and Functions, Netherlands, 2 Pages. Retrieved Nov. 5, 2020 from Webpage: https://admateceurope.com/files/10f1a369 c2239943e6506f27ba920bd4dd9359078e744369695ab6ffbde75c6c? filename=Admaflex%20300%20brochure.pdf&sig= hQvDlzxkSmFOZwjM.

(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

An additive manufacturing apparatus includes a stage configured to hold a component. A radiant energy device is operable to generate and project radiant energy toward the stage. An actuator is configured to change a relative position of the stage relative to the radiant energy device. A feed module is configured to support a feed roll of a resin support upstream of the stage about a feed mandrel. A first control device is operably coupled with the feed mandrel. A take-up module is configured to support a take-up roll of the resin support downstream of the stage about a take-up mandrel. A second control device is operably coupled with the take-up mandrel. A computing system is operably coupled with one or more sensors. The computing system is configured to provide commands to at least one of the first control device or the second control device to respectively rotate the first (Continued)

control device or the second control device to obtain a target tension on the resin support.

19 Claims, 8 Drawing Sheets

(51) Int. Cl.
  *B33Y 30/00* (2015.01)
  *B33Y 50/02* (2015.01)
  *B29C 64/321* (2017.01)
  *B29C 64/245* (2017.01)
  *B29C 64/227* (2017.01)
  *B29C 64/218* (2017.01)

(52) U.S. Cl.
  CPC ............ *B29C 64/321* (2017.08); *B33Y 10/00* (2014.12); *B33Y 30/00* (2014.12); *B33Y 50/02* (2014.12); *B29C 64/218* (2017.08)

(58) Field of Classification Search
  USPC ...................................................... 425/375
  See application file for complete search history.

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |

(56) References Cited

U.S. PATENT DOCUMENTS

| | | |
|---|---|---|
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,071,055 B2 | 9/2011 | Davidson et al. |
| 8,029,642 B2 | 10/2011 | Hagman |
| 8,048,261 B2 | 11/2011 | McCowin |
| 8,070,473 B2 | 12/2011 | Kozlak |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,527,272 B2 | 12/2016 | Steele |
| 9,529,371 B2 | 12/2016 | Nakamura |

(56) References Cited

U.S. PATENT DOCUMENTS

| | | |
|---|---|---|
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscysn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 9/2005 | Ishikawa et al. |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0195994 A1 | 8/2012 | El-Siblani et al. |
| 2012/0292800 A1 | 11/2012 | Higuchi et al. |
| 2013/0008879 A1 | 1/2013 | Bichsel |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0214327 A1 | 7/2016 | Ucklemann et al. |

(56) References Cited

U.S. PATENT DOCUMENTS

| | | |
|---|---|---|
| 2016/0221262 A1 | 8/2016 | Das et al. |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0389137 A1 | 12/2019 | Frolmmaier et al. |
| 2020/0001398 A1 | 1/2020 | Mellor et al. |
| 2020/0001525 A1* | 1/2020 | Wynne .................. B33Y 30/00 |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0238624 A1* | 7/2020 | Dubelman .............. B33Y 30/00 |
| 2020/0247040 A1 | 8/2020 | Green |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1* | 2/2021 | Thompson ............ B29C 64/264 |
| 2022/0088868 A1* | 3/2022 | Duoss .................. B29C 64/245 |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, the 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk/wiki/Types_of_brick_bonding.

(56) References Cited

OTHER PUBLICATIONS

Doctor Blade with Micrometer Screw Gauge, the Tape Casting Warehouse, Inc., Morrisville PA, 6 Pages. Retrieved Mar. 23, 2021 from Webpage: https://www.drblade.com/.

ENVISIONTEC, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.

KUDO3D, Post-Process Your SLA Prints in 4 Easy Steps, 8 Pages. Retrieved from Webpage: https://www.kudo3d.com/post-process-your-sla-prints-in-4-easy-steps/.

LEAP, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, 2 Pages. Retrieved from Webpage: http://www.lithoz.com/en/our-products/cleaning-station.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

MICRON3D, Cleaning of Printed Models, YouTube, Dec. 5, 2016, 1 Page. Retrieved from Webpage: https://www.youtube.com/watch?v=soAIrSs1iBY.

Nussbaum et al., Evaluation of Processing Variables in Large Area Polymer Sintering of Single Layer Components, Solid Freeform Fabrication 2016: Proceedings of the 27$^{th}$ Annual International Solid Freeform Fabracation Symposium—An Additive Manufacturing Conference Reviewed Paper, University of South Florida, Tampa Florida.

Omegasonics, Ultrasonic Cleaning of 3D Printer Parts, YouTube, Feb. 26, 2014, 1 p.. Retrieved from Webpage: https://www.youtube.com/watch?v=Gxj47OS5ohk.

Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.

Prodways Tech, Prodways Movinglight Technology Retrieved on Jul. 2, 2020 from Web Link: https://www.prodways.com/en/the-prodways-movinglight-technology/.

RAMCO Equipment Corporation, RAMCO RamTough-Fully Automated Wash/Rinse/Dry System, YouTube, Jul. 9, 2013, 1 Page. Retrieved from Webpage: https://www.youtube.com/watch?v=i8S5Oc3FVFU.

RICOH Imaging Company LTD., the Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.

Sonics & Materials, Inc., Ultrasonic Food Cutting Equipment, Sonics & Materials, Inc., Retrieved on Jun. 26, 2020, 4 Pages https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.

Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/admatecs-ceramic-3d-printers.

Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.

Telsonic Ultrasonics, Cutting Awning Fabrics and Sealing the Edge, the Powerhouse of Ultrasonics, 2017, 1 Page. https://www.telsonic.com/fileadmin/applications/AS_206_Cut_Seal_Markisengewebe_EN.pdf.

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.

Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.

Wikipedia, Pixel Shifting, 2 Pages. Retrieved Mar. 30, 2021 from Webpage: https://en.wikipedia.org/wiki/Pixel_shifting.

Wikipedia, Standing Wave, 11 Pages. Retrieved Mar. 17, 2021 from Webpage: https://en.wikipedia.org/wiki/Standing_wave.

\* cited by examiner

DRIVE SYSTEM FOR ADDITIVE MANUFACTURING

FIELD

The present subject matter relates generally to an additive manufacturing apparatus, and more particularly to a drive system for the additive manufacturing apparatus.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a flexible radiotransparent resin support, such as a tape or foil, that is fed out from a feed module to a build zone. Radiant energy is produced from a radiant energy device and directed through a window to cure the resin to a component that is supported by a stage in the build zone. Once the curing of the first layer is complete, the stage and the resin support are separated from one another. The resin support is then advanced by a drive system and fresh resin is provided to the build zone. In turn, the first layer of the cured resin is placed onto the fresh resin and cured through the energy device to form an additional layer of the component. Subsequent layers are added to each previous layer until the component is completed.

In operation, the drive system attempts to advance the resin support a predefined distance and keep its tension within a target range. Accordingly, it may be beneficial for the additive manufacturing apparatus to include a drive system that more accurately advances the resin support the predefined distance while maintaining the resin support within the target tension range.

BRIEF DESCRIPTION

Aspects and advantages of the present disclosure will be set forth in part in the following description, or may be obvious from the description, or may be learned through practice of the present disclosure.

In some embodiments of the present disclosure, an additive manufacturing apparatus includes a stage configured to hold a component. A radiant energy device is operable to generate and project radiant energy toward the stage. An actuator is configured to change a relative position of the stage relative to the radiant energy device. A feed module is configured to support a feed roll of a resin support upstream of the stage about a feed mandrel. A first control device is operably coupled with the feed mandrel. A take-up module is configured to support a take-up roll of the resin support downstream of the stage about a take-up mandrel. A second control device is operably coupled with the take-up mandrel. A computing system is operably coupled with one or more sensors. The computing system is configured to provide commands to at least one of the first control device or the second control device to respectively rotate the first control device or the second control device to obtain a target tension on the resin support.

In some embodiments of the present disclosure, a method of operating an additive manufacturing apparatus includes determining a first radius of a feed roll of a resin support positioned about a feed mandrel within a feed module. The method further includes determining a first radius of a take-up roll of the resin support about a take-up mandrel within a take-up module. The method also includes translating the resin support a target first linear distance by rotating the take-up mandrel by a first amount of rotation based on a predefined linear resin support movement distance and the first radius of the take-up roll.

In some embodiments of the present disclosure, an additive manufacturing apparatus includes a stage configured to hold a component. A radiant energy device is operable to generate and project radiant energy toward the stage. An actuator is configured to change a relative position of the stage and the radiant energy device. A feed module includes a feed roll rolled about a feed mandrel. A first control device is operably coupled with the feed mandrel. A take-up module includes a take-up roll rolled about a take-up mandrel. A second control device is operably coupled with the take-up mandrel. A computing system is operably coupled with a position sensor and a take-up roll proximity sensor. The control device is configured to translate a resin support a target linear distance and the computing system is configured to determine a detected first linear distance. The computing system is further configured to determine an error between the first target linear distance and the first detected linear distance.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
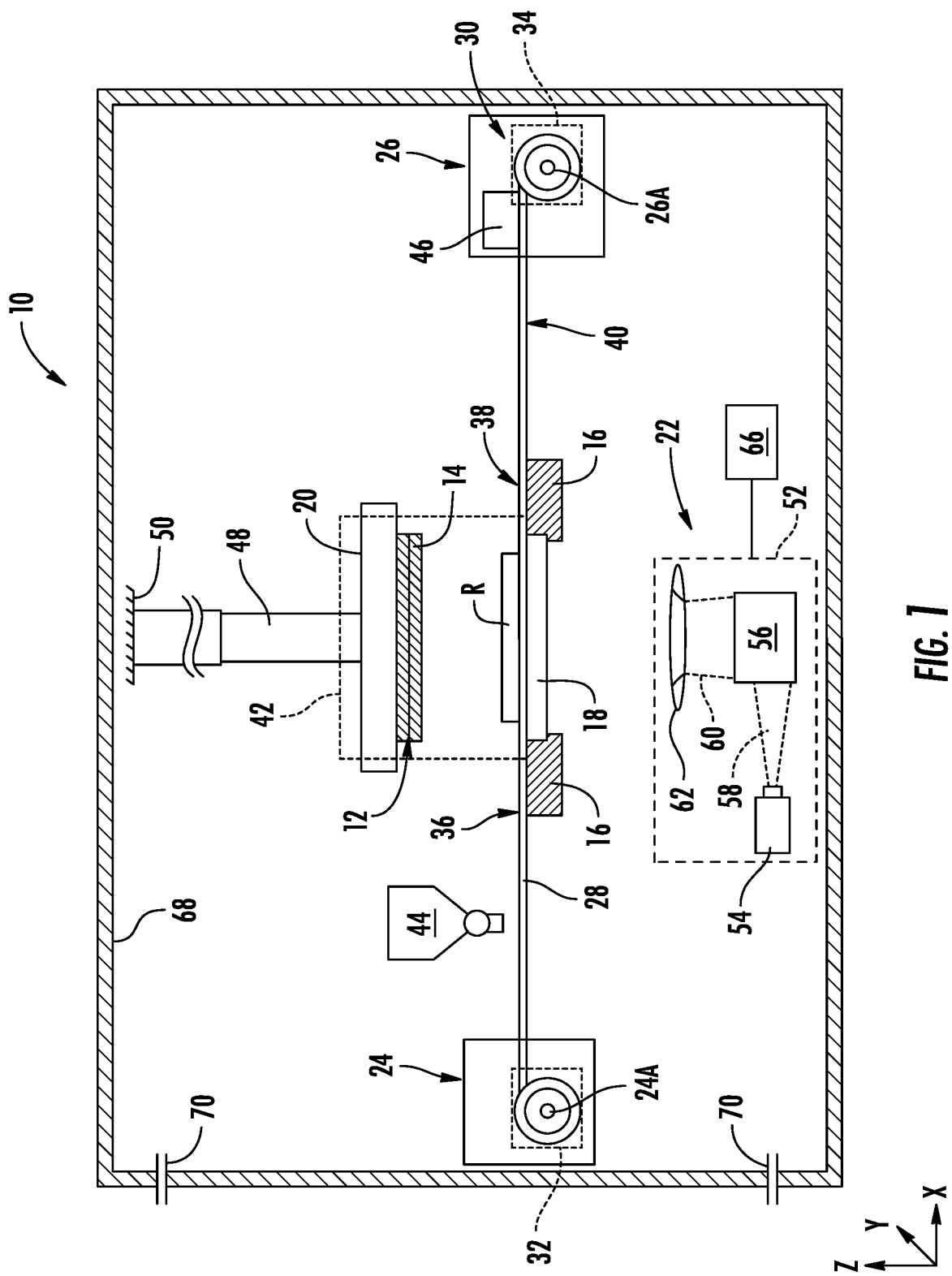
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure.

As used herein, the terms "first," "second," and "third" may be used interchangeably to distinguish one component from another and are not intended to signify a location or importance of the individual components. Moreover, for purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner. Thus, it will be appreciated that the apparatus and/or any component described here may be oriented in one or more orientations that are rotationally offset from those illustrated without departing from the scope of the present disclosure.

The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support, such as a foil or tape, movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state, a first state and a second state, etc.) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components lthough additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. In some examples, the additive manufacturing apparatus can further include a resin that is deposited as a layer having a desired thickness onto a resin support (e.g., foil, tape, or other resin support) that is fed out from a feed module. Radiant energy is used to cure the resin through the resin support. Once the curing of the first layer is complete, the stage is retracted, taking the cured material with it. In some instances, the support plate may be positioned above the stage and the stage may move downwardly as the component is built in a layer-by-layer manner. The resin support is then advanced to expose a fresh clean section, ready for additional resin to be deposited in a subsequent, new cycle.

In operation, a drive system may translate the resin support from a feed module to a take-up module. The feed module may be positioned on a first side of the stage and the take-up module may be positioned on a second opposing side of the stage. The drive system may include one or more control devices that control a translation distance, which may be linear, of the resin support and/or a tension of the resin support. In some instances, the drive system may include a first control device that is operably coupled with a feed mandrel within the feed module. The first control device may generally control a tension of the resin support. The drive system may further include a second control device that is operably coupled with a take-up mandrel within the take-up module. The second control device may generally control a translation distance of the resin support.

In various examples, the drive system may include and/or be operably coupled with a computing system that may be used for real-time control (e.g., feedforward, feedback, or other control algorithms) of the first and second control devices. Various sensor data may be fed to the computing system to be utilized by the control algorithms. In operation, the computing system may allow for more accurate control of the resin support during the operation of the apparatus, which can lead to a more precise and reliable resin support drive system.

Referring to the drawings wherein identical reference numerals denote the similar elements throughout the various views, FIG. 1 schematically illustrates an example of one type of suitable apparatus 10 for forming a component 12 created through one or more successive layers 14. The apparatus 10 can include one or more of a support plate 16, a window 18, a stage 20 that is movable relative to the window 18, and a radiant energy device 22, which, in combination, may be used to form any number (e.g., one or more) of additively manufactured components 12.

In the illustrated example, the apparatus 10 includes a feed module 24, which may include a feed mandrel 24A, and a take-up module 26, which may include a take-up mandrel 26A, that are spaced-apart with a flexible tape or resin support 28 or another type of resin support extending therebetween. The feed mandrel 24A and/or the take-up mandrel 26A can be configured to control the speed and direction of the resin support 28 such that the desired tension and speed is maintained in the resin support 28 through a drive system 30. By way of example and not limitation, the drive system 30 can be configured as one or more control devices 32, 34 associated with the feed mandrel 24A and/or the take-up mandrel 26A. Moreover, various components, such as motors, actuators, brakes (mechanical and/or electrical), feedback sensors, and/or controls can be provided for driving the mandrels 24A, 26A in such a manner so as to maintain the resin support 28 tensioned between the mandrels 24A, 26A and to translate the resin support 28 along a resin support path from the feed mandrel 24A to the take-up mandrel 26A. In other examples, the resin support 28 may be configured as a belt that translates one or more plates between the feed module 24 and the take-up module 26. Each plate may be configured to hold a layer of resin R.

In various embodiments, the window 18 is transparent and can be operably supported by the support plate 16. Further, the window 18 and the support plate 16 can be integrally formed such that one or more windows 18 are integrated within the support plate 16. Likewise, the resin support 28 is also transparent or includes transparent portions. As used herein, the terms "transparent" and "radiotransparent" refer to a material that allows at least a portion of radiant energy of a selected wavelength range to pass through. For example, the radiant energy that passes through the window 18 and the resin support 28 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 28 extends between the feed module 24 and the take-up module 26 and defines a "resin surface" 36, which is shown as being planar, but could alternatively be arcuate (depending on the shape of the support plate 16). In some instances, the resin surface 36 may be defined by a first side 38 of the resin support 28. The resin surface 36 may be positioned to face the stage 20 with the window 18 on an opposing, second side 40 of the resin support 28 from the stage 20. For purposes of convenient description, the resin surface 36 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 28. As used herein, the Y-axis refers to the transverse direction across the width of the resin support 28 and generally perpendicular to the machine direction. As used herein, the Z-axis refers to the stage direction that can be defined as the direction of movement of the stage 20 relative to the window 18.

The resin surface 36 may be configured to be "non-stick," that is, resistant to adhesion of a cured resin R. The non-stick properties may be embodied by a combination of variables such as the chemistry of the resin support 28, a surface finish of the resin support 28, and/or coatings applied to the resin support 28. For instance, a permanent or semi-permanent non-stick coating may be applied. One non-limiting example of a suitable coating is polytetrafluoroethylene ("PTFE"). In some examples, all or a portion of the resin surface 36 may incorporate a controlled roughness or surface texture (e.g. protrusions, dimples, grooves, ridges, etc.) with nonstick properties. Additionally or alternatively, the resin support 28 may be made in whole or in part from an oxygen-permeable material.

For reference purposes, an area or volume immediately surrounding the location of the resin support 28 and the window 18 or transparent portion defined by the support plate 16 may be defined as a "build zone," labeled 42.

In some instances, a material depositor 44 may be upstream of the build zone 42. The material depositor 44 may be any device or combination of devices that is operable to apply a layer of the resin R on the resin support 28. The material depositor 44 may optionally include a device or combination of devices to define a height of the resin R on the resin support 28 and/or to level the resin R on the resin support 28. Nonlimiting examples of suitable material deposition devices include chutes, hoppers, pumps, spray nozzles, spray bars, or printheads (e.g. inkjets). In some examples, a doctor blade may be used to control the thickness of resin R applied to the resin support 28, as the resin support 28 passes the material depositor 44.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with the resin R, then loaded into the material depositor 44. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including, but not limited to, polymeric, ceramic, glass, and/or metallic materials. The proportion of filler to resin R may be selected to suit a particular application. Generally, any amount of filler may be used so long as the combined material is capable of flowing and being leveled, and there is sufficient resin R to hold together the particles of the filler in the cured state.

In some embodiments, a reclamation system 46 may be configured to remove at least a portion of uncured resin R that remains on the resin support 28 once a portion of the resin support 28 having the uncured resin R thereon is downstream of the build zone 42. For example, the reclamation system 46 may include a wiper assembly, a blade assembly, and/or any other removal assembly and a reservoir for collecting the resin R that is removed from the resin support 28.

With further reference to FIG. 1, the stage 20 is capable of being oriented parallel to the resin surface 36, or the X-Y plane. Various devices may be provided for moving the stage 20 relative to the window 18 parallel to the Z-axis direction. For example, as illustrated in FIG. 1, the movement may be provided through an actuator assembly 48 that may be coupled with a static support 50. The actuator assembly 48 may include any device practicable of moving the stage 20 relative to the radiant energy device 22, the support plate 16, the window 18, and/or any other static component of the apparatus 10. The actuator assembly 48 may be configured as ballscrew electric actuators, linear electric actuators, pneumatic cylinders, hydraulic cylinders, delta drives, belt systems, or any other practicable device.

The radiant energy device 22 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 22 may include a projector 52, which may generally refer to any device operable to generate a radiant energy image of suitable energy level and other operating characteristics to cure the resin R. As used herein, the term "patterned image" refers to a projection of radiant energy comprising an array of one or more individual pixels. Non-limiting examples of image devices include a DLP projector or another digital micromirror device, a two-dimensional array of LEDs, a two-dimensional array of lasers, and/or optically addressed light valves. In the illustrated example, the projector 52 includes a radiant energy source 54 such as a UV lamp, an image forming apparatus 56 operable to receive a source beam 58 from the radiant energy source 54 and generate a patterned image 60 to be projected onto the surface of the resin R, and optionally focusing optics 62, such as one or more lenses.

The image forming apparatus 56 may include one or more mirrors, prisms, and/or lenses and is provided with suitable actuators, and arranged so that the source beam 58 from the radiant energy source 54 can be transformed into a pixelated image in an X-Y plane coincident with the surface of the resin R. In the illustrated example, the image forming apparatus 56 may be a digital micro-mirror device.

The projector 52 may incorporate additional components, such as actuators, mirrors, etc. configured to selectively move the image forming apparatus 56 or another part of the projector 52 with the effect of rastering or shifting the location of the patterned image on the resin surface 36. Stated another way, the patterned image may be moved away from a nominal or starting location.

In addition to other types of radiant energy devices 22, the radiant energy device 22 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 54 and a beam steering apparatus. The radiant energy source 54 may include any device operable to generate a beam of suitable power and other operating characteristics to cure the resin R. Non-limiting examples of suitable radiant energy sources 54 include lasers or electron beam guns.

The apparatus 10 may be operably coupled with a computing system 66. The computing system 66 in FIG. 1 is a generalized representation of the hardware and software that may be implemented to control the operation of the apparatus 10, including some or all of the stage 20, the radiant energy device 22, the actuator assembly 48, and the various parts of the apparatus 10 described herein. The computing system 66 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, for feedback control, and/or feedforward control. Numerous aspects of the apparatus 10 may be subject to closed-loop control.

Optionally, the components of the apparatus 10 may be surrounded by a housing 68, which may be used to provide a shielding or inert gas (e.g., a "process gas") atmosphere using gas ports 70. Optionally, pressure within the housing 68 could be maintained at a desired level greater than or less than atmospheric. Optionally, the housing 68 could be temperature and/or humidity controlled. Optionally, ventilation of the housing 68 could be controlled based on factors such as a time interval, temperature, humidity, and/or chemical species concentration. In some embodiments, the housing 68 can be maintained at a pressure that is different than an atmospheric pressure.

Figure 2:
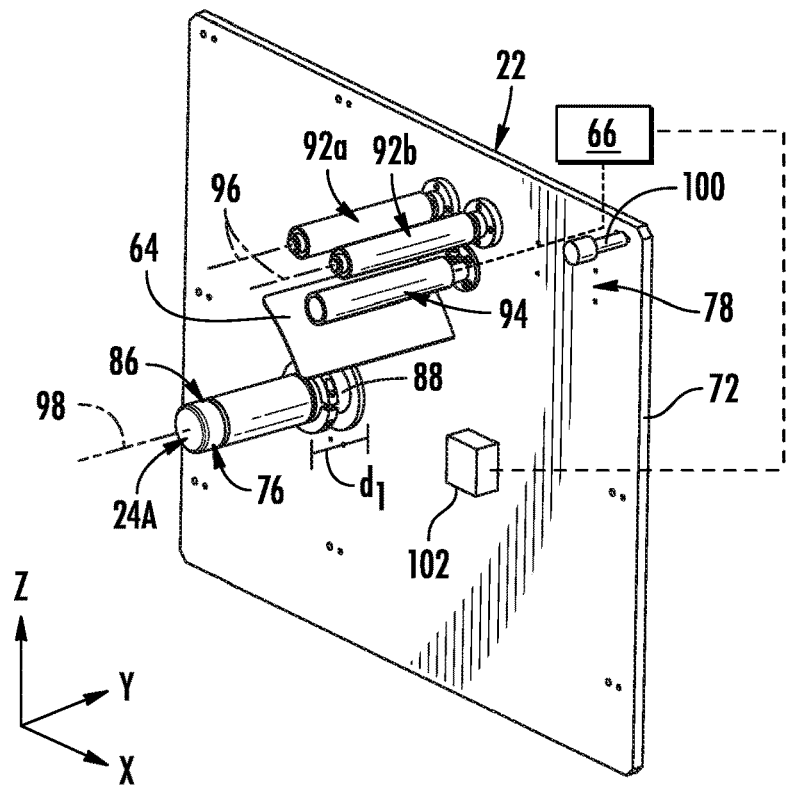
FIG. 2 is a front perspective view of a feed module in accordance with various aspects of the present disclosure.
Figure 3:
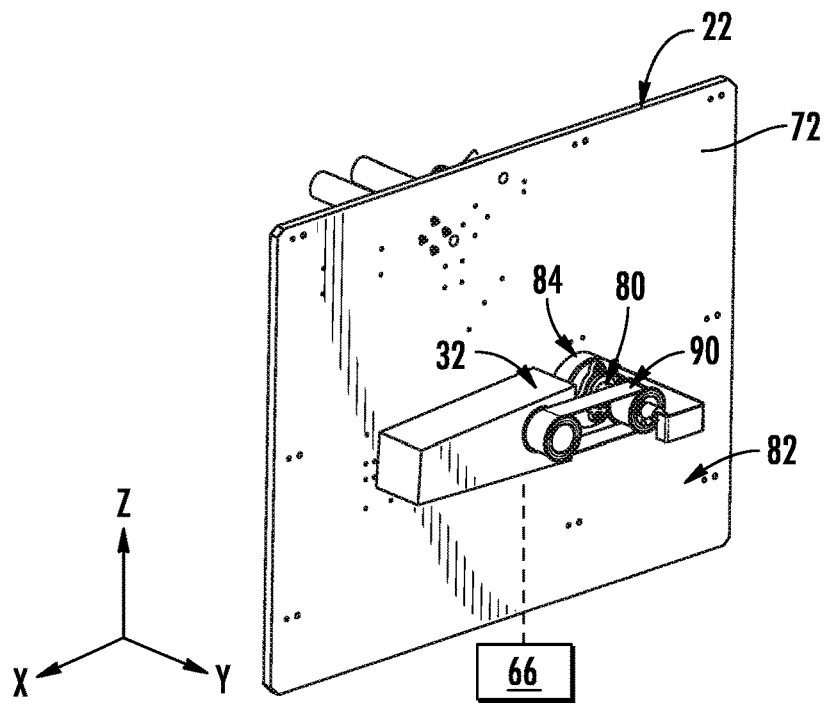
FIG. 3 is a rear perspective view of the feed module in accordance with various aspects of the present disclosure.
Figure 7:
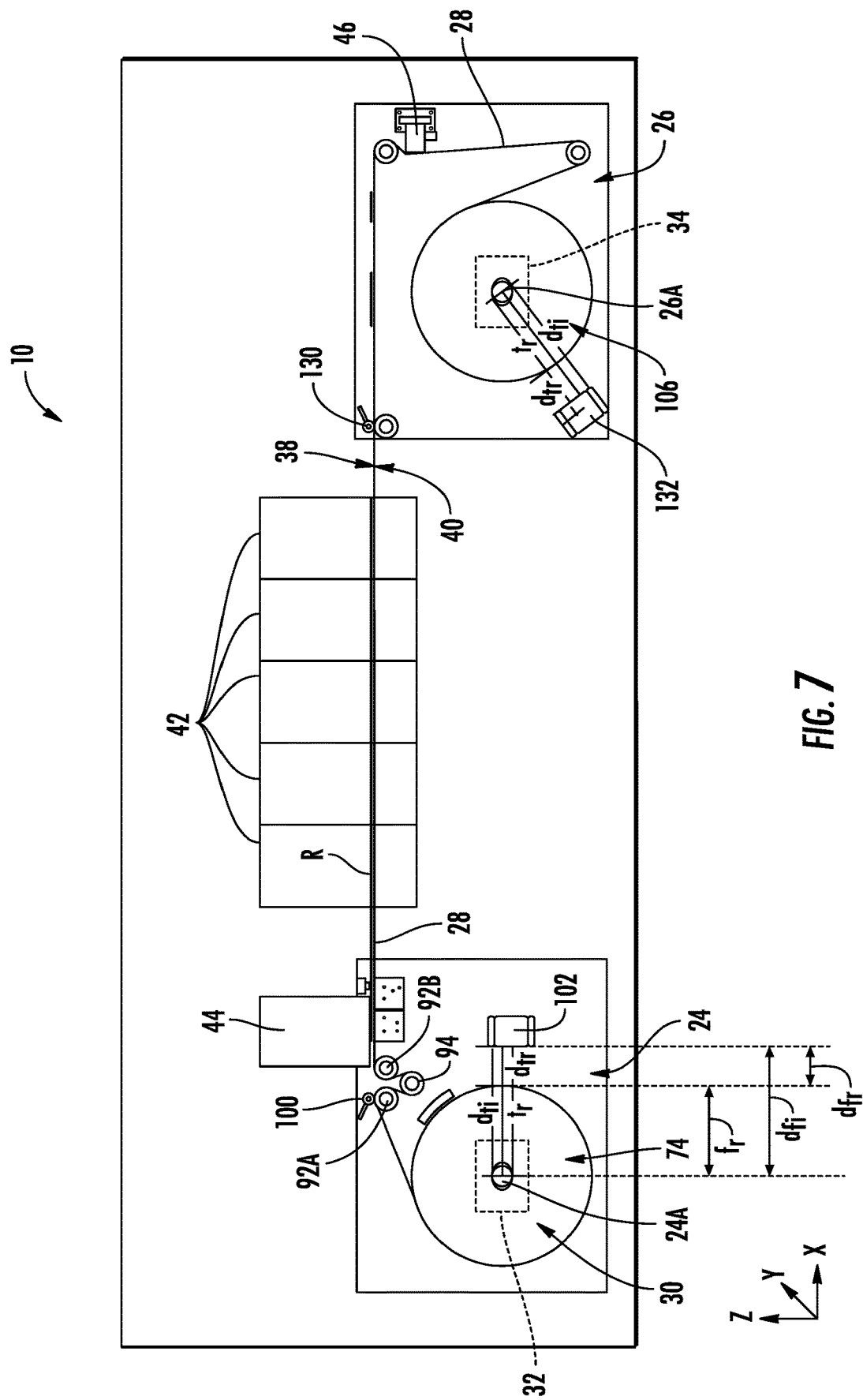
FIG. 7 is a front schematic view of the apparatus having a plurality of build stations in accordance with various aspects of the present disclosure.

Referring to FIGS. 2 and 3, exemplary perspective views of the feed module 24 including a first plate 72 are illustrated in accordance with exemplary embodiments of the present disclosure. As illustrated, the feed mandrel 24A can be anchored to the first plate 72 and may support and rotate a feed roll 74 (FIG. 7) of the resin support 28 (FIG. 7). In various embodiments, the feed mandrel 24A includes a front portion 76 on a first side 78 of the first plate 72 and a rear portion 80 on a second, opposing side 82 of the first plate 72. In some instances, a bearing 84 may be positioned along the front portion 76, the rear portion 80, and/or between the front and rear portions 76, 80.

The front portion 76 of the feed mandrel 24A may include a cylindrical portion 86 that is configured to accept the feed roll 74 of the resin support 28 thereabout. In various instances, the resin support 28 may be operably coupled to a first spool (e.g., e.g., cardboard spool, polymeric spool, paper-based spool, metallic spool, composite spool, elastomeric spool, etc.), and the first spool may be positioned about the feed mandrel 24A.

A stop 88 may be positioned between the cylindrical portion 86 and the first plate 72. As such, when the resin support 28 is wrapped about the feed mandrel 24A, the stop 88 defines a first distance $d_1$ between an inner edge of the resin support 28 and the first plate 72. In some examples, the feed mandrel 24A may be configured to move between a disengaged position and an engaged position. In operation, the feed mandrel 24A may be placed in the disengaged position to allow the first spool, and the resin support 28 wound thereabout, to be slid along the feed mandrel 24A to a position in which an end portion of the first spool is in contact or proximate to the stop 88. Once the first spool is positioned about the feed mandrel 24A, the feed mandrel 24A may be placed in the engaged position causing the first spool, and, consequently, the feed roll 74 of the resin support 28 to rotate with the feed mandrel 24A. In several examples, the feed roll 74 may define an outer diameter and an inner diameter. In some instances, a ratio of the outer diameter to the inner diameter may be greater than 4:1, 5:1, 6:1, 7:1, 8:1, or more. For example, in various non-limiting examples, the feed roll 74 may have an outer diameter of about twenty four inches and an inner diameter of about three and one quarter inches. In such instances, the ration of the outer diameter to the inner diameter may be about 7.4:1. It will be appreciated that this ratio is greater than commercially available additive manufacturing apparatuses.

In some embodiments, the drive system 30 (FIG. 1) may include a first control device 32 operably coupled with the feed mandrel 24A and extending from the first plate 72. The first control device 32 may be configured as one or more motors, actuators, brakes (mechanical and/or electrical), or any other device that may rotate the feed mandrel 24A. Further, as illustrated in FIG. 3, the first control device 32 may include a transmission 90 in the form of a belt system, a gear system, and/or any other practicable system.

With further reference to FIGS. 2 and 3, one or more rollers 92A, 92B, and/or a tension sensor 94, such as a load cell, may be anchored to the first side 78 of the first plate 72. For example, a pair of rollers 92A, 92B may be positioned above the feed mandrel 24A in the Z-axis direction. In some instances, the pair of rollers 92A, 92B may have an axis of rotation 96 that is generally parallel to an axis of rotation 98 of the feed mandrel 24A.

The tension sensor 94 may be positioned between the pair of rollers 92A, 92B and the feed mandrel 24A in the Z-axis direction. The tension sensor 94 may be configured as a force transducer that converts a tension or torque provided by the resin support 28 onto the tension sensor into an electrical signal that can be measured by the computing system 66 to determine a tension of the resin support 28. In some embodiments, the resin support 28 may be provided from the feed mandrel 24A around the first roller 92A, the tension sensor 94, and, subsequently, the second roller 92B.

As illustrated in FIG. 2, a cover 64 may be anchored to the first side 78 of the first plate 72. In various instances, the cover 64 may be configured to prevent any resin that might drip from dripping onto the feed roll 74 (FIG. 7) and/or any other component of the apparatus 10. Additionally or alternatively, the cover 64 may also prevent damage to various components of the apparatus while loading the feed roll 74 onto and/or off of the apparatus 10.

Referring still to FIGS. 2 and 3, in some embodiments, a first position sensor 100 may be operably coupled with the first plate 72 and configured to detect a movement the resin support 28. The first position sensor 100, and/or any other sensor, may be capable of monitoring a movement (e.g., a linear distance) of the resin support 28 and may be positioned at any point within the feed module 24 or any other location upstream of the build stage 20. In several embodiments, the first position sensor 100 may be configured as a mechanical, optical, on-axis magnetic, and/or off-axis magnetic, may be an absolute encoder, an incremental encoder, and/or any other type of practicable encoder. Moreover, the first position sensor 100 may be any other type of practicable sensor without separating from the scope of the present disclosure.

The feed module 24 may further include a feed roll proximity sensor 102 that may be configured to detect a distance $d_{fr}$ (FIG. 7) between the feed roll proximity sensor 102 and the feed roll 74 of the resin support 28. As the resin support 28 is translated from the feed module 24 to the take-up module 26, the distance between the feed roll proximity sensor 102 and the feed roll 74 of the resin support 28 increases as a radius of the feed roll 74 is reduced. This change in distance may be provided to the computing system 66, which in turn, may be used to calculate a radius $f_r$ (FIG. 7) of the feed roll 74.

Figure 4:
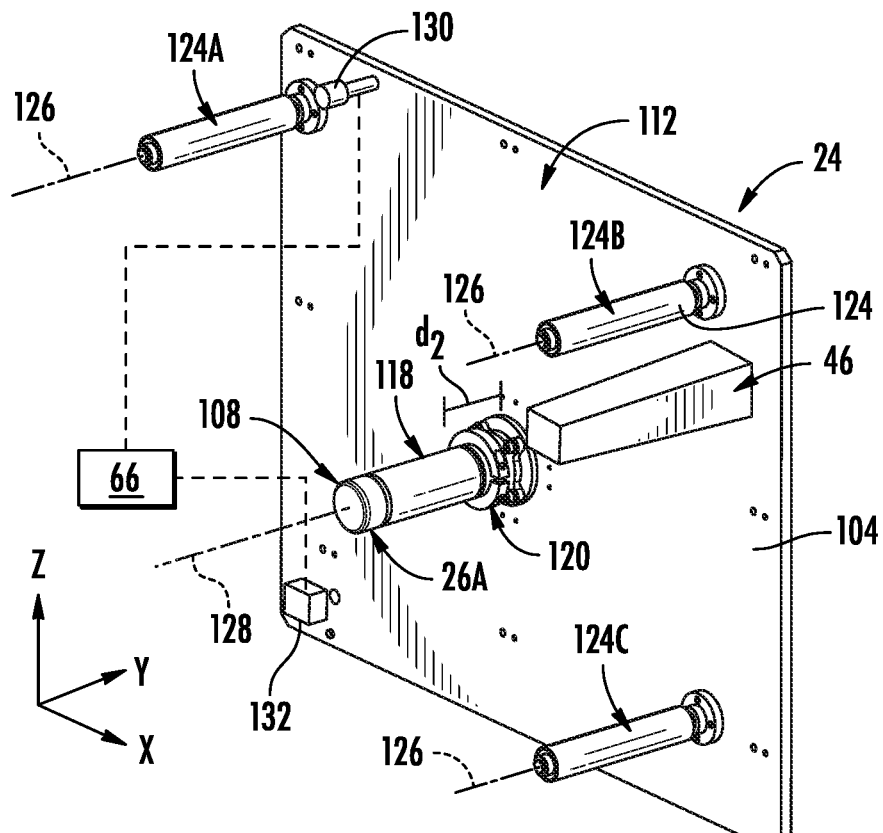
FIG. 4 is a front perspective view of a take-up module in accordance with various aspects of the present disclosure.
Figure 5:
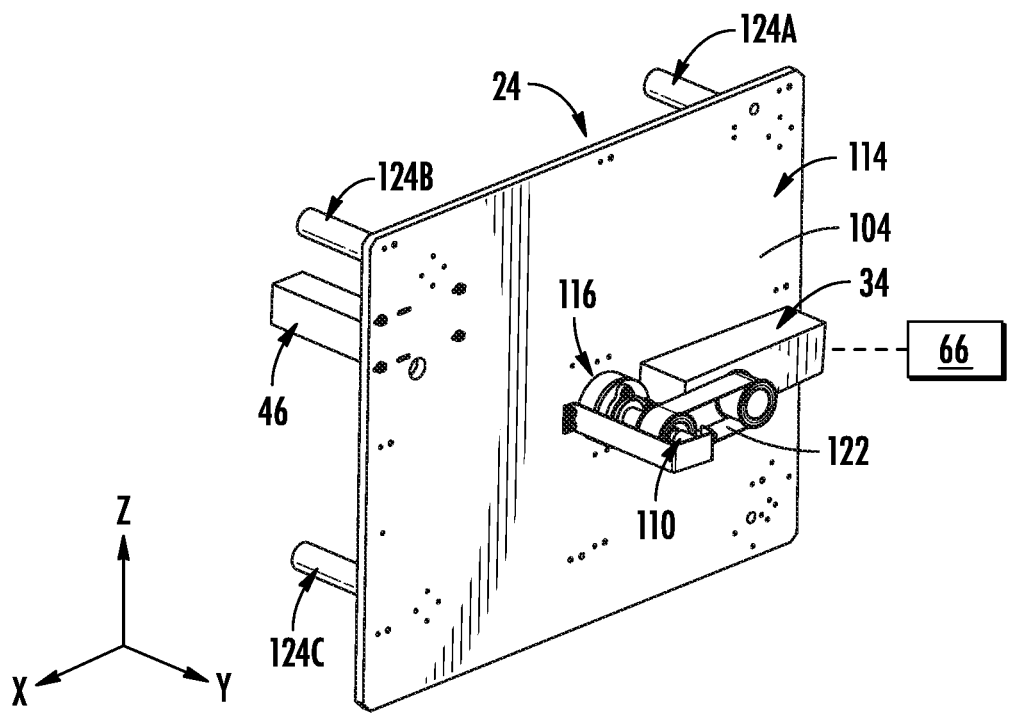
FIG. 5 is a rear perspective view of the take-up module in accordance with various aspects of the present disclosure.

Referring to FIGS. 4 and 5, respective front and rear perspective views of the take-up module 26 including a second plate 104 are illustrated in accordance with exemplary embodiments of the present disclosure. As illustrated, the take-up mandrel 26A may be anchored to the second plate 104 and configured to support a take-up roll 106 (FIG. 7) of the resin support 28.

In various embodiments, the take-up mandrel 26A includes a front portion 108 on a first side 112 of the second plate 104 and a rear portion 110 on a second, opposing side 114 of the second plate 104. In some instances, a bearing 116 may be positioned along the front portion 108, the rear portion 110, and/or between the first and second portions 108, 110 of the take-up mandrel 26A.

The front portion 108 of the take-up mandrel 26A may include a cylindrical portion 118 that is configured to accept the take-up roll 106 of the resin support 28 thereabout. In various instances, the resin support 28 may be operably coupled to a second spool (e.g., cardboard spool, polymeric spool, paper-based spool, metallic spool, composite spool, elastomeric spool, etc.). The second spool may be positioned about the take-up mandrel 26A.

A stop 120 may be positioned between the cylindrical portion 118 and the second plate 104. As such, the resin support 28 is wrapped about the take-up mandrel 26A, the stop 120 defines a second distance $d_2$ between the inner edge of the resin support 28 and the second plate 104. In some examples, the take-up mandrel 26A may be configured to move between a disengaged position and an engaged position. In operation, the take-up mandrel 26A may be placed in the disengaged position to allow the second spool to be slid along the take-up mandrel 26A to a position in which an end portion of the second spool is in contact or proximate to the stop 120. Once the second spool is positioned about the take-up mandrel 26A, the take-up mandrel 26A may be placed in the engaged position causing the second spool, and, consequently, the take-up roll 106 of the resin support 28 to rotate with the take-up mandrel 26A.

Similar to the feed module 24, a second control device 34 may be operably coupled with the take-up mandrel 26A and extends from the second plate 104. The second control device 34 may be configured as one or more motors, actuators, or any other device that may rotate the take-up mandrel 26A. Further, as illustrated in FIG. 5, the second control device 34 may include a transmission 122 in the form of a belt system, a gear system, and/or any other practicable system. Moreover, the first control device 32 and the second control device 34 may be operably coupled with feedback sensors and/or controls that can be provided for driving the mandrels 24A, 26A in such a manner so as to maintain the resin support 28 tensioned between the mandrels 24A, 26A and to wind the resin support 28 from the feed mandrel 24A to the take-up mandrel 26A.

With further reference to FIGS. 4 and 5, one or more rollers 124 may be anchored to the first side 112 of the second plate 104. For example, a set of three rollers 124A, 124B, 124C may be positioned on various portions of the second plate 104. In some instances, each roller 124A, 124B, 124C may have an axis of rotation 126 that is generally parallel to an axis of rotation 128 of the take-up mandrel 26A.

The second plate 104 may further support the reclamation system 46, which may be configured to remove at least a portion of resin R that remains on the resin support 28 after the resin support 28 is removed from a build zone 42 (FIG. 1). For example, the reclamation system 46 may include a wiper assembly, a blade assembly, and/or any other removal assembly for collecting the resin R that is removed from the resin support 28.

Referring still to FIGS. 4 and 5, in some embodiments, in addition to or instead of the first position sensor 100 upstream of the build stage 20, the apparatus 10 may include a second position sensor 130 downstream of the build stage 20. The second position sensor 130, and/or any other sensor, may be capable of monitoring a movement (e.g., a linear distance) of the resin support 28 and may be positioned at any point within the take-up module 26 or any other location downstream of the build stage 20. In various embodiments, the second position sensor 130 may be used for redundancy and verification of the drive system 30. Additionally or alternatively, the computing system can compare the difference of motion between the first position sensor 100 and the second position sensor 130 to determine whether the drive system 30 is stretching/over tensioning the resin support 28. In several embodiments, the second position sensor 130 may be configured as a mechanical, optical, on-axis magnetic, and/or off-axis magnetic, an absolute encoder, an incremental encoder, and/or any other type of practicable encoder. Moreover, the second position sensor 100 may be any other type of practicable sensor without departing from the scope of the present disclosure.

The take-up module 26 may further include a take-up roll proximity sensor 132 that may be configured to detect a distance between the take-up roll proximity sensor 132 and the take-up roll 106 (FIG. 7) of the resin support 28. As the resin support 28 is translated from the feed module 24 to the take-up module 26, the distance between the take-up roll proximity sensor 132 and the take-up roll 106 of the resin support 28 decreases as a radius of the take-up roll 106 is increased. This change in distance may be provided to the computing system 66, which in turn, may be used to calculate a radius of the take-up roll 106.

Figure 6:
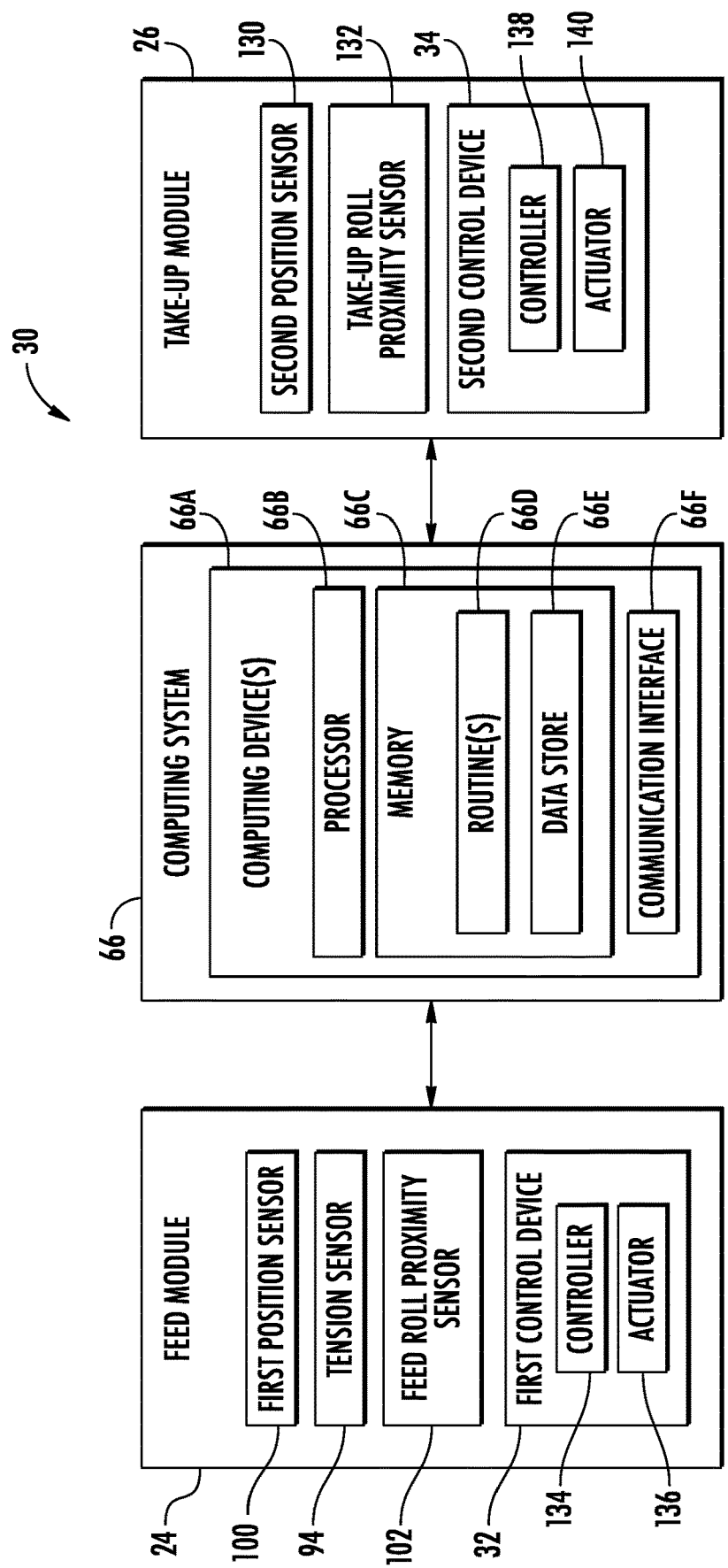
FIG. 6 is a block diagram of a drive system of the apparatus in accordance with various aspects of the present disclosure.

Referring now to FIGS. 6 and 7, a block diagram of the drive system 30 for the additive manufacturing apparatus 10 and a front schematic view of the additive manufacturing apparatus 10 are respectively depicted according to example embodiments of the present disclosure. As illustrated, the drive system 30 may be operably coupled with the computing system 66. The computing system 66 can include one or more computing device(s) 66A. The computing device(s) 66A can include one or more processor(s) 66B and one or more memory device(s) 66C. The one or more processor(s) 66B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 66C can include one or more non-transitory computer-readable storage medium(s), such as RAM, ROM, EEPROM, EPROM, flash memory devices, magnetic disks, etc., and/or combinations thereof.

The memory device(s) 66C can include one or more computer-readable media and can store information accessible by the one or more processor(s) 66B, including routines 66D that can be executed by the one or more processor(s) 66B. The memory device(s) 66C can store the routines 66D for running one or more software applications, operating the drive system 30, displaying a user interface, receiving user input, processing user input, etc. In some implementations, the routines 66D can be executed by the one or more processor(s) 66B to cause the one or more processor(s) 66B to perform operations, e.g., such as one or more portions of methods described herein. The routines 66D can be software written in any suitable programming language or can be implemented in hardware. Additionally, and/or alternatively, the routines 66D can be executed in logically and/or virtually separate threads on processor(s) 66B.

The one or more memory device(s) 66C can also store data 66E that can be retrieved, manipulated, created, or stored by the one or more processor(s) 66B. The data 66E can include, for instance, data to facilitate performance of one or more routines and/or methods 200 (FIG. 9), 300 (FIG. 10) described herein. The data 66E can be stored in one or more database(s). The one or more database(s) can be connected to computing system 66 by a high bandwidth LAN or WAN, or can also be connected to the computing system 66 through network(s). The one or more database(s) can be split up so that they are located in multiple locales. In some implementations, the data 66E can be received from another device.

The computing device(s) 66A can also include a communication module or interface 66F used to communicate with one or more other component(s) of the computing system 66 or the additive manufacturing apparatus 10 over the network(s). The communication interface 66F can include any suitable components for interfacing with one or more network(s), including, for example, transmitters, receivers, ports, controllers, antennas, or other suitable components. In the embodiment illustrated in FIG. 6, various components of the feed module 24 and the take-up module 26 may also be coupled with the computing system 66. As illustrated, each of the various components of the feed module 24 and the take-up module 26 may be coupled with one or more computing devices of the computing system 66 through one or more communication interfaces.

As illustrated, in some examples, the first position sensor 100 of the feed module 24 may be operably coupled with the computing system 66. In general, the first position sensor 100 can measure and determine a movement distance of the resin support 28. The first position sensor 100 can send information in the form of a series of pulse trains (or pulse waves) corresponding to the measured movement to a computing system 66, which interprets the pulse trains received to determine the movement distance of the resin support 28. Additionally or alternatively, the first position sensor 100 has a processing circuitry that is capable of determining a rotational speed of a contact portion of the first position sensor 100.

The tension sensor 94 may also be positioned within the feed module 24 and operably coupled with the computing system 66. The tension sensor 94 may be capable of determining a tension of the resin support 28 between the feed roll 74 and the take-up roll 106. The tension sensor 94 may be a force transducer that converts a tension or torque provided by the resin support 28 onto the tension sensor 94 into an electrical signal that can be measured by the computing system 66 to determine a tension of the resin support 28.

The feed roll proximity sensor 102 may be operably coupled with the computing system 66 and be capable of detecting a distance between the feed roll proximity sensor 102 and an outer circumference of the feed roll 74. In various examples, the feed roll proximity sensor 102 may be an ultrasonic sensor, a radio detection and ranging (RADAR) sensor, a sound navigation and ranging (SONAR) sensor, a light detection and ranging (LIDAR) sensor, a vision-based sensor, and/or any other type of practicable sensor.

The first control device 32 may include a first controller 134 and a first actuator 136 that is configured to drive the feed mandrel 24A. In various embodiments, the first actuator 136 may be configured as one or more of a stepper motor, a servo motor, and/or any other type of rotational actuator. The first controller 134 can provide the actuator with generated control signals, such as pulse width modulated (PWM) signals or current control signals, to provide an amount of torque on the feed mandrel 24A. In turn, the feed roll 74 of the resin support 28 coupled with the feed mandrel 24A may also have the amount of torque applied thereto. The first controller 134 may include control circuitry such as analog and/or digital control circuitry with logic for processing the various inputs and controlling the first actuator 136 as described herein. The first controller 134 may further include any combination of software and/or processing circuitry suitable for controlling the first actuator 136. It will be appreciated that the first controller 134 may be integrated into the control device, the computing system 66, or otherwise coupled with the first actuator 136.

With further reference to FIGS. 6 and 7, as provided herein, in addition to or instead of the first position sensor 100 upstream of the build stage 20, the apparatus 10 may include a second position sensor 130 downstream of the build stage 20. For instance, the second position sensor 130 may be within the take-up module 26. The second position sensor 130, and/or any other sensor, may be capable of monitoring a movement (e.g., a linear distance) of the resin support 28 and may be positioned at any point within the take-up module 26 or any other location downstream of the build stage 20. The second position sensor 130 can send information in the form of a series of pulse trains (or pulse waves) corresponding to the measured movement to a computing system 66, which interprets the pulse trains received to determine the length of linear movement of the resin support 28. Alternatively, the second position sensor 130 has a processing circuitry that is capable of determining the rotational speed of a contact portion of the second position sensor 130.

The take-up module 26 may also include a take-up roll proximity sensor 132 operably coupled with the computing system 66. The take-up roll proximity sensor 132 may be configured as any proximity sensor that is capable of detecting a distance between the take-up roll proximity sensor 132 and an outer circumference of the take-up roll 106. For example, like the feed roll proximity sensor 102, the take-up roll proximity sensor 132 may be configured as an ultrasonic sensor, a radio detection and ranging (RADAR) sensor, a sound navigation and ranging (SONAR) sensor, a light detection and ranging (LIDAR) sensor, a vision-based sensor, and/or any other type of practicable sensor.

The second control device 34 may include a second controller 138 and a second actuator 140 that is configured to drive the take-up mandrel 26A. In various embodiments, the second actuator 140 may be configured as one or more of a stepper motor, a servo motor, and/or any other type of rotational actuator. The second controller 138 can provide the actuator with generated control signals, such as pulse width modulated (PWM) signals or current control signals, to rotate the second actuator 140 by a predefined amount of rotation. The amount of rotation may be any angular change in the second actuator 140 which leads to an angular change of the take-up mandrel 26A. In turn, the take-up roll 106 of the resin support 28 may also be rotated. The second controller 138 may include control circuitry such as analog and/or digital control circuitry with logic for processing the various inputs and controlling the second actuator 140 as described herein. The second controller 138 may further include any combination of software and/or processing circuitry suitable for controlling the second actuator 140. It will be appreciated that the second controller 138 may be integrated into the second control device 34, the computing system 66, or otherwise coupled with the second actuator 140. In some instances, the distance of the resin support 28 can be a predefined value while angular rotation amount of take-up mandrel 26A is a variable to radius change of take-up mandrel 26A.

Figure 8:
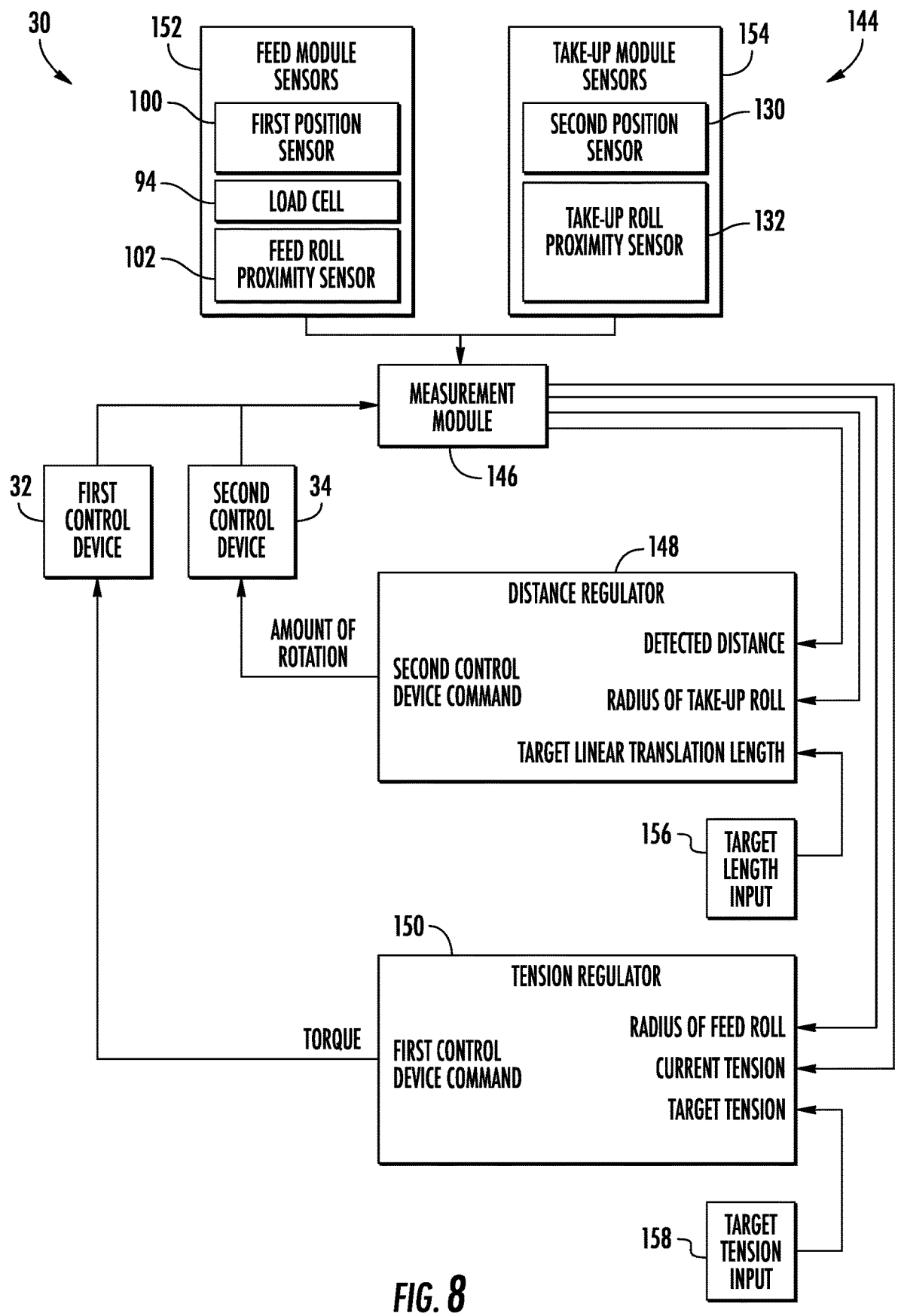
FIG. 8 is a block diagram illustrating portions of the drive system in accordance with various aspects of the present disclosure.

Referring to FIGS. 6-8, in operation, the computing system 66 is configured to provide instructions to at least one of the first control device 32 or the second control device 34 of the drive system 30 through a drive system routine 144. For example, in some instances, the first control device 32 can receive instructions to control the feed mandrel 24A to obtain a target tension on the resin support 28 and the second control device 34 can receive instructions to control at least one of a velocity, distance, or acceleration of a movement of the resin support 28 from the feed module 24 to the take-up module 26. In various embodiments, the first control device 32 and the second control device 34 can operate independently from each other.

The drive system routine 144 of the drive system 30 is generally illustrated in FIG. 8, according to several embodiments, whereby a measurement module 146, a distance regulator 148, and a tension regulator 150 are routines that may be stored in the memory device 66C of the computing system 66, the first controller 134, and/or the second controller 138. The measurement module 146, the distance regulator 148, and/or the tension regulator 150 may operate based on the plurality of inputs. For instance, the plurality of inputs may be provided by one or more feed module sensors 152, such as the first position sensor 100, the tension sensor 94, the feed roll proximity sensor 102. Additionally or alternatively, the plurality of inputs may be provided by one or more take-up module sensors 154, such as the second position sensor 130, the take-up roll proximity sensor 132, or any other sensor of the apparatus 10.

As illustrated in FIG. 8, a target length 156 of resin support's movement is accepted as an input into the distance regulator 148. The target length 156 may be a user-inputted value and/or generated by the computing system 66. In instances in which the target length 156 is generated by the computing system 66, the target distance may be based on various factors, such as the dimensions of the component 12 to be formed, the dimensions of the stage 20, the number of stages 20, the number of radiant energy devices 22, the size(s) of various window(s) 18, the size of the layer 14 of the component 12 to be formed, the thickness of the layer 14 of the component 12 that was just formed, the thickness of the layer 14 of the component 12 that is next to be formed, etc. The target length 156 may be the same and/or altered for each successive layer 14 of the component 12 during the build process. The target length 156 may be predefined by the computing system 66 based on the computer-generated build-up of the component 12.

In various embodiments, the distance regulator 148 may receive data from the measurement module 146 related to the linear movement of a first translation of the resin support 28 (FIG. 7). Each of the first position sensor 100 and/or the second position sensor 130 can send data in the form of a series of pulse trains (or pulse waves) corresponding to the measured movement of the resin support 28 to the distance regulator 148, which interprets the pulse trains received to determine a length of linear movement of the resin support 28. Alternatively, each of the first position sensor 100 and/or the second position sensor 130 can have processing circuitry that is capable of determining the rotational speed of a contact portion of the first position sensor 100 and/or the second position sensor 130.

The distance regulator 148 may also receive a detected distance $d_{tr}$ between the take-up roll proximity sensor 132 and the take-up roll 106 of the resin support 28. Based on the detected distance $d_{tr}$ and a known distance do from the take-up proximity sensor 132 to the axis of rotation 128 of the take-up mandrel 26A, a radius $t_r$ of the take-up roll 106 may be calculated by equation (1):

$$t_r = d_{ti} - d_{tr}. \tag{1}$$

Based on the radius $t_r$ of the take-up roll 106, the distance regulator 148 may be configured to calculate an amount of rotation $A_{rt}$ for moving the resin support 28 a target first linear distance $T_{d1}$, which may be calculated by equation (2):

$$A_{rt} = \frac{Td_1}{2\pi t_r}. \tag{2}$$

Once the amount of rotation $A_{rt}$ for moving the resin support 28 the target first linear distance is calculated, a distance command is provided to the second control device 34 to rotate the second control device 34 the amount of rotation $A_{rt}$.

As illustrated, a target tension 158 of the resin support 28 is accepted as an input into the tension regulator 150. The target tension 158 may be a user-inputted value and/or generated by the computing system 66. In instances in which the target tension 158 is generated by the computing system 66, the target tension 158 may be based on various factors such as the type of resin support 28, the dimensions of the component 12 to be formed, the stage 20, the number of stages 20, the number of radiant energy devices 22, the size(s) of various window(s) 18, the size of the layer 14 of the component 12 to be formed, the thickness of the layer 14 of the component 12 that was just formed, the thickness of the layer 14 of the component 12 that is next to be formed, etc. The target tension 158 may be the same and/or altered for each successive layer of the component 12 during the build process. The target tension 158 may be predefined by the computing system 66 based on the computer-generated build-up of the component 12.

The tension regulator 150 may receive a detected distance $d_{fr}$ between the feed roll proximity sensor 102 and the feed roll 74 of the resin support 28. Based on the detected distance $d_{fr}$ and a known distance dh from the feed roll proximity sensor 102 to the axis of rotation 98 (FIG. 2) of the feed mandrel 24A, a radius $f_r$ of the feed roll 74 may be calculated by equation (3):

$$f_r = d_{fi} - d_{fr}. \tag{3}$$

Based on the radius $f_r$ of the feed roll 74, the torque regulator may be configured to calculate an amount of torque to be applied to the feed mandrel 24A by the first control device 32 in the form of a torque command for the first control device 32. The torque applied by the feed mandrel 24A may be provided and/or adjusted during translation of the resin support 28 by the second control device 34 and/or during periods in which the resin support 28 may be generally stationary, such as when a new uncured resin R is positioned within the build zone 42.

When a new portion of the resin support 28 is to be translated into the build zone 42 (FIG. 1), a distance command is determined. Once the distance command is generated, the distance command may be provided to the second control device 34.

In some instances, the torque command may be provided to the first control device 32. In some instances, the torque command may initially be a predefined tension or tension range based on the type of foil support, the apparatus, and/or any other factor. In various examples, the torque regulator 150 may include a feedforward controller and/or a feedback controller. The feedforward controller can be a model-based controller, which utilizes the radius $f_r$ of the feed roll 74 to calculate the target torque needed for the target tension. The feedback controller can be a proportional-integral-derivative controller (PID) loop, which utilizes load cell data to compensate for any remaining tension errors. As the first and second control devices 32, 34 are operated such that the resin support 28 moves a target distance (or within a target distance range) at a target tension 158 (or within a target tension range) by the computing system 66, the first controller 134, and/or the second controller 138 using one or more suitable timing algorithms to intermittently and/or constantly update the torque command through a control loop.

While the resin support 28 is translated, the second control device 34 may control the position, velocity, and/or acceleration. The distance regulator 148 may continuously or intermittently receive data from the measurement module 146 for altering the translation of the resin support 28. In various instances, the measurement module 146 may provide data obtained from the first position sensor 100 and/or the second position sensor 130, which is correlated to an amount of angular rotation of the take-up roll 106 by the distance regulator 148.

Based on the correlation, the distance regulator may alter control of successive rotations of the take-up mandrel 26A. For example, the distance regulator 148 may provide a distance command to the second control device 34 causing the take-up mandrel 26A and, possibly, the take-up roll 106 to rotate a target first linear distance. The first position sensor 100 and/or the second position sensor 130 may collect data related to the linear distance traveled by the resin support 28 which is then used to determine a detected first linear distance. The distance regulator 148 may then determine an error between the detected first linear distance and the target first linear distance. After a layer 14 of the component 12 is formed, or at any other time, the distance regulator 148 may receive a target second linear distance to be translated by the resin support 28. The distance regulator 148 can again determine a radius dor (FIG. 7) of the take-up roll 106 and a second amount of rotation. The second amount of rotation may then be scaled based on the error to output a scaled second amount of rotation. The scaled second amount of rotation may be provided to the second control device 34 as a second distance command. Once the second distance command is received by the second control device 34, the second control device 34 may rotate the take-up mandrel 26A by the scaled second amount of rotation.

The tension of the resin support 28 may generally be maintained within a range of a predefined target tension 158. In various embodiments, the tension of the resin support 28 may be maintained through the tension regulator 150 and may include a feedback portion and a feedforward portion. Together, the feedback portion and the feedforward portion may determine a torque to regulate the resin support tension. For instance, the feedback portion of the drive system routine 144 may use measurements from the measurement module 146 to determine an amount of torque to be applied to the feed mandrel 24A by the first control device 32. The feedforward portion may use the dimensions of the feed roll 74 of the resin support 28 and/or the take-up roll 106 of the resin support 28 to determine an amount of torque to be applied to the feed mandrel 24A by the first control device 32. In various embodiments, the tension regulator 150 may continuously or intermittently receive data from the measurement module 146 for controlling the tension of the resin support 28. In turn, the tension regulator 150 can determine a tension on the resin support 28 through the tension sensor 94 and provide a torque command to the first control device 32 to alter a torque from a first torque to a second torque based on the first torque differing from the predefined torque target.

In some examples, the tension regulator 150 may provide a torque command to the first control device 32 causing the feed mandrel 24A and the feed roll 74 to rotate with a first amount of torque. The tension sensor 94 may collect data related to the tension of the resin support 28 which is then used to determine a detected first tension. The tension regulator 150 may then determine an error between the detected first tension and the target first tension. After a layer 14 of the component 12 is formed, or at any other time, the tension regulator 150 may receive a target second tension of the resin support 28. The tension regulator 150 can determine a current tension of the resin support 28, a radius $d_{fr}$ (FIG. 7) of the feed roll 74 about the feed mandrel 24A, and a radius $d_{tr}$ (FIG. 7) of the take-up roll 106 about the take-up mandrel 26A. Based on these conditions, the tension regulator 150 may determine a second amount of torque to be applied to the feed mandrel 24A to obtain a target second tension of the resin support 28. The second amount of torque may then be scaled based on the error to output a scaled second amount of torque. The scaled second amount of torque may be provided to the first control device 32 as a second torque command. Once the second torque command is received by the first control device 32, the first control device 32 may provide the scaled second amount of torque to the feed mandrel 24A. In some instances, the tension regulator 150 updates the target torque at a relatively high-frequency interval, such as 2 kHz. In some instances, the update of the target torque may not be correlated or synchronized to the print process, such as after a layer is formed.

In various examples, the first control device 32 is configured to rotate a first angular amount and the second control device 34 is configured to rotate a second angular amount as the resin support 28 is translated between the feed mandrel feed mandrel 24A and the take-up mandrel 26A. In some instances, the first angular amount is varied from the second angular amount. For example, the first angular amount may be greater than or less than the second angular amount. Additionally or alternatively, in some instances, the first angular amount may be generally equal to the second angular amount.

It will be appreciated that although the embodiment described herein utilizes the first control device 32 to control the tension and the second control device 34 to control translation of the resin support 28, in other embodiments, the first control device 32 may control the translation of the resin support 28 in addition to or instead of controlling the tension of the resin support 28 without departing from the scope of the present disclosure. Likewise, the second control device 34 may control the tension of the resin support 28 in addition to or instead of controlling the translation of the resin support 28 without departing from the scope of the present disclosure.

Figure 9:
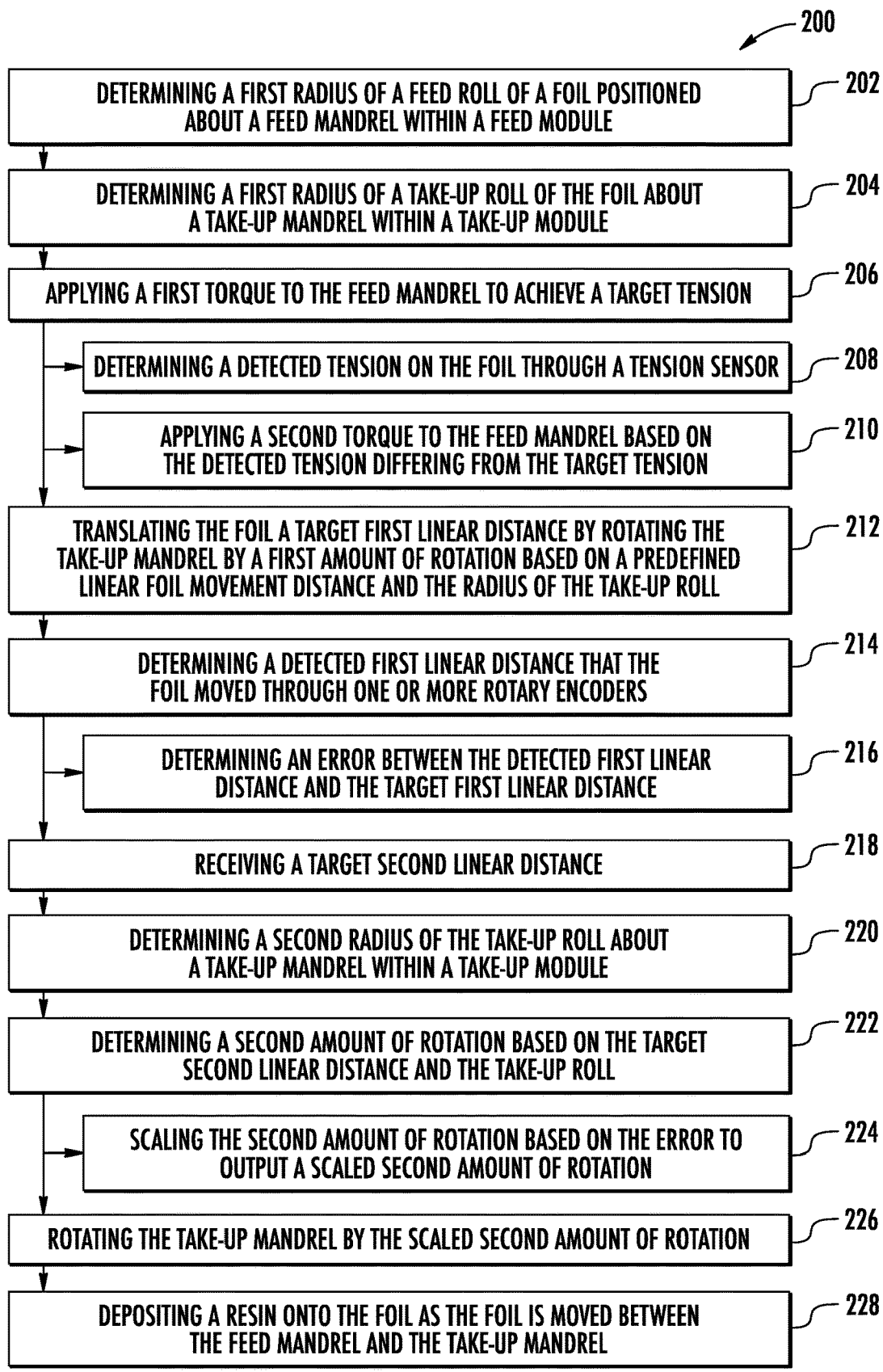
FIG. 9 is a method of operating the manufacturing apparatus in accordance with various aspects of the present disclosure.
Figure 10:
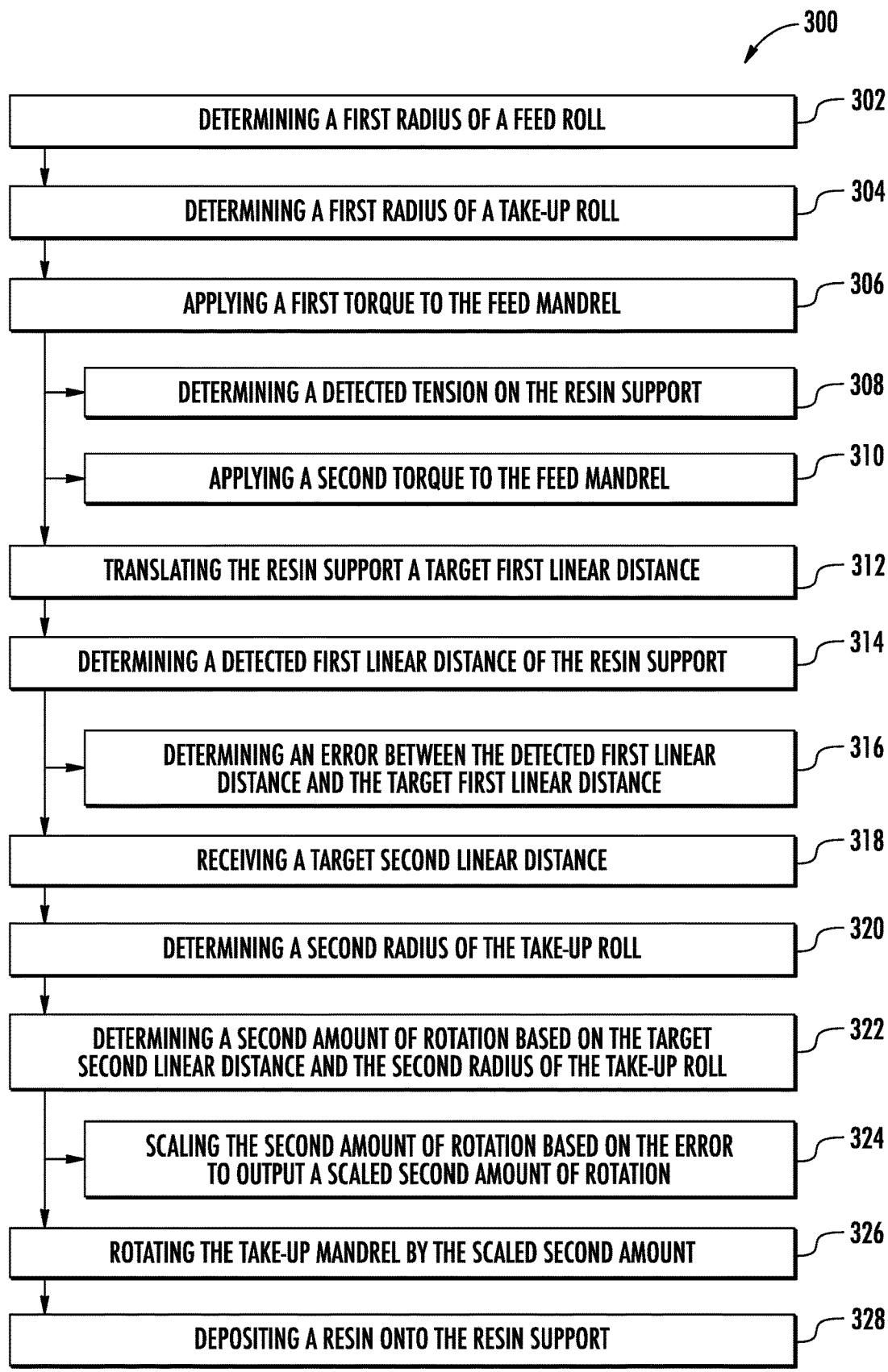
FIG. 10 is a method of operating the manufacturing apparatus in accordance with various aspects of the present disclosure.

Now that the construction and configuration of the additive manufacturing apparatus having one or more accumulators have been described according to various examples of the present subject matter, various methods 200, 300 for operating an additive manufacturing apparatus are provided in FIGS. 9 and 10. The methods 200, 300 can be used to operate the additive manufacturing apparatus. It should be appreciated that the example methods 200, 300 are discussed herein only to describe example aspects of the present subject matter and are not intended to be limiting.

Referring now to FIG. 9, the method 200 includes, at step 202, determining a first radius of a feed roll of a resin support positioned about a feed mandrel within a feed module. As provided herein, the feed module may include a feed roll proximity sensor that may be operably coupled with the computing system and can be capable of detecting a distance between the feed roll proximity sensor and an outer circumference of the feed roll. Based on the distance between the feed roll proximity sensor and an outer circumference of the feed roll, the first radius of the feed roll may be determined.

At step 204, the method 200 may include determining a first radius of a take-up roll of the resin support about a take-up mandrel within a take-up module. As provided herein, the take-up module may include a take-up roll proximity sensor that may be operably coupled with the computing system and can be capable of detecting a distance between the take-up roll proximity sensor and an outer circumference of the take-up roll. Based on the distance between the take-up roll proximity sensor and an outer circumference of the take-up roll, the first radius of the take-up roll may be determined.

Next, at step 206, the method 200 can include applying a first torque to the feed mandrel to achieve a target tension. The target tension may be manually inputted prior to an operation of the apparatus and/or provided by the computing system. Once the first torque is applied to the feed mandrel, the method 200, at step 208, can include determining a detected tension on the resin support through a tension sensor. In various examples, the tension sensor may be configured as a load cell having a force transducer that converts a tension or torque provided by the resin support onto the tension sensor into an electrical signal that can be measured by the computing system to determine a tension of the resin support.

In response to determining a detected tension of the resin support, at step 212, the method 200 can include applying a second torque to the feed mandrel if the detected tension differs from the target tension.

At step 212, the method 200 can include translating the resin support a target first linear distance by rotating the take-up mandrel by a first amount of rotation. The first amount of rotation may be based on a predefined linear resin support movement distance and the radius of the take-up roll.

Moreover, at step 214, the method 200 can include determining a detected first linear distance that the resin support moved through one or more position sensors. Each of the one or more position sensors can send information in the form of a series of pulse trains (or pulse waves) corresponding to the measured movement to the computing system, which interprets the pulse trains received to determine the length of linear movement of the resin support. With the calculated distance from the one or more position sensors, at step 216, the method 200 can include determining an error between the detected first linear distance and the target first linear distance.

At step 218, the method 200 can include receiving a target second linear distance. When the second target linear distance is received, at step 220, the method 200 can include determining a second radius of the take-up roll about a take-up mandrel within a take-up module. At step 222, the method 200 can include determining a second amount of rotation based on the target second linear distance and the second radius of the take-up roll. At step 224, the method 200 can include scaling the second amount of rotation based on the error to output a scaled second amount of rotation. Then, at step 226, the method 200 can include rotating the take-up mandrel by the scaled second amount of rotation to translate the resin support.

As the resin support is translated from the feed module to the take-up module, the method 200, at step 228, can include depositing a resin onto the resin support as the resin support is moved between the feed mandrel and the take-up mandrel.

It will be appreciated that the resin support may be translated any number of times (one or more) and the tension may be adjusted any number of times (one or more) during the translation of the resin support and/or between the translations of the resin support. Further, the number of times that the resin support is translated, the distance the resin support is translated, and the tension on the resin support at any period during operation may be based on the component design and the number of layers used to form the component. Any of the steps provided herein may be repeated any number of times during some periods of operation and not utilized during periods of operation.

Referring now to FIG. 10, in various embodiments, a method 300 for operating an additive manufacturing apparatus can include, at step 302, determining a first radius of a feed roll of a resin support positioned about a feed mandrel within a feed module. In some examples, the first radius of a feed roll of a resin support may be inputted or predetermined prior to operation of the apparatus. In some examples, the computing system may receive an initial radius of the feed roll and the number of rotations of the feed roll since the feed roll was installed to determine the first radius.

At step 304, the method 300 may include determining a first radius of a take-up roll of the resin support about a take-up mandrel within a take-up module. In some instances, the first radius of the take-up roll may be inputted or predetermined prior to operation of the apparatus. In some examples, the computing system may receive an initial radius of the take-up roll and the number of rotations of the take-up roll since the take-up roll was installed to determine the first radius. Additionally or alternatively, as provided herein, the take-up module may include a take-up roll proximity sensor that may be operably coupled with the computing system and can be capable of detecting a distance between the take-up roll proximity sensor and an outer circumference of the take-up roll. Based on the distance between the take-up roll proximity sensor and an outer circumference of the take-up roll, the first radius of the take-up roll may be determined.

Next, at step 306, the method 300 can include applying a first torque to the feed mandrel to achieve a target tension. The target tension may be manually inputted prior to an operation of the apparatus and/or provided by the computing system. Once the first torque is applied to the feed mandrel, the method 300, at step 308, can include determining a detected tension on the resin support through a tension sensor.

In response to determining a detected tension of the resin support, at step 310, the method 300 can include applying a second torque to the feed mandrel if the detected tension differs from the target tension.

At step 312, the method 300 can include translating the resin support a target first linear distance by rotating the take-up mandrel by a first amount of rotation. The first amount of rotation may be based on a predefined linear resin support movement distance and the radius of the take-up roll.

Moreover, at step 314, the method 300 can include determining a detected first linear distance that the resin support moved through one or more position sensors. Each of the one or more position sensors can send information in the form of a series of pulse trains (or pulse waves) corresponding to the measured movement to the computing system, which interprets the pulse trains received to determine the length of linear movement of the resin support. With the calculated distance from the one or more position sensors, at step 316, the method 300, at step 318, can include determining an error between the detected first linear distance and the target first linear distance.

Once the system has been calibrated, as generally described by steps 302-316, at step 318, the method 300 can include receiving a target second linear distance. When the second target linear distance is received, at step 320, the method 300 can include determining a second radius of the take-up roll about a take-up mandrel within a take-up module. At step 322, the method 300 can include determining a second amount of rotation based on the target second linear distance and the second radius of the take-up roll. At step 324, the method 300 can include scaling the second amount of rotation based on the error to output a scaled second amount of rotation. Then, at step 326, the method 300 can include rotating the take-up mandrel by the scaled second amount of rotation to translate the resin support. As the resin support is translated, the method 300, at step 328, can include depositing a resin onto the resin support.

It will be appreciated that the resin support may be translated any number of times (one or more) and the tension may be adjusted any number of times (one or more) during the translation of the resin support and/or between the translations of the resin support. Further, the number of times that the resin support is translated, the distance the resin support is translated, and the tension on the resin support at any period during operation may be based on the component design and the number of layers used to form the component. Any of the steps provided herein may be repeated any number of times during some periods of operation and not utilized during periods of operation.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt-based superalloys (e.g., those available under the name Inconel® available from Special Metals Corporation). These materials are examples of materials suitable for use in the additive manufacturing processes described herein and may be generally referred to as "additive materials."

Further aspects are provided by the subject matter of the following clauses:

An additive manufacturing apparatus comprising: a stage configured to hold a component; a radiant energy device operable to generate and project radiant energy toward the stage; an actuator configured to change a relative position of the stage relative to the radiant energy device; a feed module configured to support a feed roll of a resin support upstream of the stage about a feed mandrel; a first control device operably coupled with the feed mandrel; a take-up module configured to support a take-up roll of the resin support downstream of the stage about a take-up mandrel; a second control device operably coupled with the take-up mandrel; and a computing system operably coupled with one or more sensors, the computing system configured to provide commands to at least one of the first control device or the second control device to respectively rotate the first control device or the second control device to obtain a target tension on the resin support.

The additive manufacturing apparatus of one or more of these clauses, wherein the first control device is configured to apply a torque to the feed mandrel to obtain a target tension on the resin support and the second control device is configured to control a target linear translation distance of the resin support from the feed module to the take-up module by rotating the take-up mandrel by an amount of rotation.

The additive manufacturing apparatus of one or more of these clauses, further comprising: a material depositor positioned downstream of the feed module and at least partially upstream of the stage.

The additive manufacturing apparatus of one or more of these clauses, wherein the one or more sensors include a tension sensor positioned within a resin support path, the tension sensor configured to detect a tension of the resin support at a position between the feed module and the take-up module.

The additive manufacturing apparatus of one or more of these clauses, wherein the one or more sensors include a position sensor configured to detect a movement of the resin support at a position upstream of the stage and downstream of the feed mandrel.

The additive manufacturing apparatus of one or more of these clauses, wherein the one or more sensors includes an encoder positioned downstream of the stage and upstream of the take-up mandrel.

The additive manufacturing apparatus of one or more of these clauses, wherein the first control device and the second control device operate independently from each other.

The additive manufacturing apparatus of one or more of these clauses, further comprising: a feed roll proximity sensor configured to detect a distance between the feed roll wrapped about the feed mandrel and the feed roll proximity sensor; and a take-up roll proximity sensor configured to detect a distance between the take-up roll wrapped about the take-up mandrel.

The additive manufacturing apparatus of one or more of these clauses, wherein the computing system is configured to regulate a tension of the resin support based on a detected resin support tension from a tension sensor positioned within a resin support path, and wherein the computing system is further configured to determine an amount of torque to apply to the feed mandrel based on a radius of the feed roll of the resin support, the radius of the feed roll of the resin support being calculated by a distance between the feed roll and the feed roll proximity sensor.

The additive manufacturing apparatus of one or more of these clauses, wherein the computing system is configured to regulate a linear translation distance of the resin support by rotating the take-up mandrel by a predefined amount of rotation based on a radius of the take-up roll of the resin support, the radius of the take-up roll being calculated by a distance between the take-up roll and the take-up roll proximity sensor.

The additive manufacturing apparatus of one or more of these clauses, wherein the first control device and the second control device each include a controller and an actuator.

A method of operating an additive manufacturing apparatus, the method comprising: determining a first radius of a feed roll of a resin support positioned about a feed mandrel within a feed module; determining a first radius of a take-up roll of the resin support about a take-up mandrel within a take-up module; and translating the resin support a target first linear distance by rotating the take-up mandrel by a first amount of rotation based on a predefined linear resin support movement distance and the first radius of the take-up roll.

The method of one or more of these clauses, further comprising: depositing a resin onto the resin support as the resin support is moved between the feed mandrel and the take-up mandrel.

The method of one or more of these clauses, further comprising: applying a first torque to the feed mandrel to achieve a target tension; determining a detected tension on the resin support through a tension sensor; and applying a second torque to the feed mandrel based on the detected tension differing from the target tension.

The method of one or more of these clauses, further comprising: determining a detected first linear distance that the resin support moved through one or more position sensors; and determining an error between the detected first linear distance and the target first linear distance.

The method of one or more of these clauses, further comprising: receiving a target second linear distance; determining a second radius of the take-up roll about the take-up mandrel within the take-up module; determining a second amount of rotation based on the target second linear distance and the second radius of the take-up roll; scaling the second amount of rotation based on the error to output a scaled second amount of rotation; and rotating the take-up mandrel by the scaled second amount of rotation.

An additive manufacturing apparatus comprising: a stage configured to hold a component; a radiant energy device operable to generate and project radiant energy toward the stage; an actuator configured to change a relative position of the stage and the radiant energy device; a feed module including a feed roll rolled about a feed mandrel; a first control device operably coupled with the feed mandrel; a take-up module including a take-up roll rolled about a take-up mandrel; a second control device operably coupled with the take-up mandrel; and a computing system operably coupled with a position sensor and a take-up roll proximity sensor, wherein the control device is configured to translate a resin support a target linear distance and the computing system is configured to determine a detected first linear distance, and wherein the computing system is further configured to determine an error between the first target linear distance and the first detected linear distance.

The additive manufacturing apparatus of one or more of these clauses, wherein the first control device is configured to rotate a first angular amount and the second control device is configured to rotate a second angular amount as the resin support is translated between the feed mandrel and the take-up mandrel, wherein the first angular amount is varied from the second angular amount.

The additive manufacturing apparatus of one or more of these clauses, wherein the computing system is further configured to rotate the take-up mandrel by a predefined amount of rotation to translate the resin support a predefined distance, the amount of rotation based on a radius of the take-up roll of the resin support.

The additive manufacturing apparatus of one or more of these clauses, wherein the computing system is further configured to regulate a tension of the resin support based on a detected resin support tension from a tension sensor positioned within a resin support path, and wherein the computing system is further configured to determine an amount of torque to be applied to the feed mandrel.

This written description uses examples to disclose the concepts presented herein, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
a stage configured to hold a component;
a radiant energy device operable to generate and project radiant energy toward the stage;
an actuator configured to change a relative position of the stage relative to the radiant energy device;
a feed module configured to support a feed roll of a resin support upstream of the stage about a feed mandrel;
a first control device operably coupled with the feed mandrel;
a take-up module configured to support a take-up roll of the resin support downstream of the stage about a take-up mandrel;
a second control device operably coupled with the take-up mandrel; and
a computing system operably coupled with one or more sensors, the computing system configured to provide commands to at least one of the first control device or the second control device to respectively rotate the first control device or the second control device to obtain a target tension on the resin support, wherein the first control device is configured to apply a torque to the feed mandrel to obtain the target tension on the resin support and the second control device is configured to control a target linear translation distance of the resin support from the feed module to the take-up module by rotating the take-up mandrel by an amount of rotation.

2. The additive manufacturing apparatus of claim 1, further comprising:
a material depositor positioned downstream of the feed module and at least partially upstream of the stage.

3. The additive manufacturing apparatus of claim 1, wherein the one or more sensors include a tension sensor positioned within a resin support path, the tension sensor configured to detect a tension of the resin support at a position between the feed module and the take-up module.

4. The additive manufacturing apparatus of claim 1, wherein the one or more sensors include a position sensor configured to detect a movement of the resin support at a position upstream of the stage and downstream of the feed mandrel.

5. The additive manufacturing apparatus of claim 1, wherein the one or more sensors includes an encoder positioned downstream of the stage and upstream of the take-up mandrel.

6. The additive manufacturing apparatus of claim 1, wherein the first control device and the second control device operate independently from each other.

7. The additive manufacturing apparatus of claim 1, further comprising:
   a feed roll proximity sensor configured to detect a distance between the feed roll wrapped about the feed mandrel and the feed roll proximity sensor; and
   a take-up roll proximity sensor configured to detect a distance between the take-up roll wrapped about the take-up mandrel and the take-up roll proximity sensor.

8. The additive manufacturing apparatus of claim 7, wherein the computing system is configured to regulate a tension of the resin support based on a detected resin support tension from a tension sensor positioned within a resin support path, and wherein the computing system is further configured to determine an amount of torque to apply to the feed mandrel based on a radius of the feed roll of the resin support, the radius of the feed roll of the resin support being calculated by a distance between the feed roll and the feed roll proximity sensor.

9. The additive manufacturing apparatus of claim 7, wherein the computing system is configured to regulate a linear translation distance of the resin support by rotating the take-up mandrel by a predefined amount of rotation based on a radius of the take-up roll of the resin support, the radius of the take-up roll being calculated by a distance between the take-up roll and the take-up roll proximity sensor.

10. The additive manufacturing apparatus of claim 1, wherein the first control device and the second control device each include a controller and an actuator.

11. An additive manufacturing apparatus comprising:
    a stage configured to hold a component;
    a radiant energy device operable to generate and project radiant energy toward the stage;
    an actuator configured to change a relative position of the stage and the radiant energy device;
    a feed module including a feed roll rolled about a feed mandrel;
    a first control device operably coupled with the feed mandrel;
    a take-up module including a take-up roll rolled about a take-up mandrel;
    a second control device operably coupled with the take-up mandrel; and
    a computing system operably coupled with a position sensor and a take-up roll proximity sensor, wherein the second control device is configured to translate a resin support a target linear distance and the computing system is configured to determine a detected first linear distance, and wherein the computing system is further configured to determine an error between the first target linear distance and the first detected linear distance.

12. The additive manufacturing apparatus of claim 11, wherein the first control device is configured to rotate a first angular amount and the second control device is configured to rotate a second angular amount as the resin support is translated between the feed mandrel and the take-up mandrel, wherein the first angular amount is varied from the second angular amount.

13. The additive manufacturing apparatus of claim 11, wherein the computing system is further configured to rotate the take-up mandrel by a predefined amount of rotation to translate the resin support a predefined distance, the amount of rotation based on a radius of the take-up roll of the resin support.

14. The additive manufacturing apparatus of claim 11, wherein the computing system is further configured to regulate a tension of the resin support based on a detected resin support tension from a tension sensor positioned within a resin support path, and wherein the computing system is further configured to determine an amount of torque to be applied to the feed mandrel.

15. An additive manufacturing apparatus comprising:
    a feed mandrel configured to support a feed roll of a resin support;
    a first control device operably coupled with the feed mandrel;
    a take-up mandrel configured to support a take-up roll of the resin support downstream of the feed mandrel;
    a second control device operably coupled with the take-up mandrel;
    a feed roll sensor configured to detect a distance between the feed roll wrapped about the feed mandrel and the feed roll sensor;
    a take-up roll sensor configured to detect a distance between the take-up roll wrapped about the take-up mandrel and the take-up roll sensor; and
    a computing system operably coupled with one or more sensors, the computing system configured to provide commands to at least one of the first control device or the second control device to respectively rotate the first control device or the second control device to obtain a target tension on the resin support.

16. The additive manufacturing apparatus of claim 15, wherein the computing system is configured to regulate a tension of the resin support based on a detected resin support tension from a tension sensor positioned within a resin support path, and wherein the computing system is further configured to determine an amount of torque to apply to the feed mandrel based on a radius of the feed roll of the resin support, the radius of the feed roll of the resin support being calculated by a distance between the feed roll and the feed roll sensor.

17. The additive manufacturing apparatus of claim 15, wherein the computing system is configured to regulate a linear translation distance of the resin support by rotating the take-up mandrel by a predefined amount of rotation based on a radius of the take-up roll of the resin support, the radius of the take-up roll being calculated by a distance between the take-up roll and the take-up roll sensor.

18. The additive manufacturing apparatus of claim 15, wherein the first control device is configured to apply a torque to the feed mandrel to obtain a target tension on the resin support and the second control device is configured to control a target linear translation distance of the resin support from the feed mandrel to the take-up mandrel by rotating the take-up mandrel by an amount of rotation.

19. The additive manufacturing apparatus of claim 15, further comprising:
    a material depositor positioned downstream of the feed mandrel and upstream of the take-up mandrel.

* * * * *